Sept. 18, 1951     L. G. EDWARDS     2,568,491
SAUSAGE-CORE FORMING MACHINE
Filed Feb. 24, 1947     2 Sheets-Sheet 1
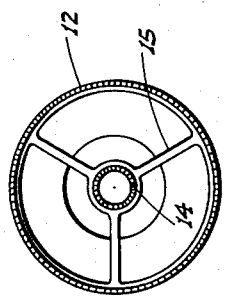
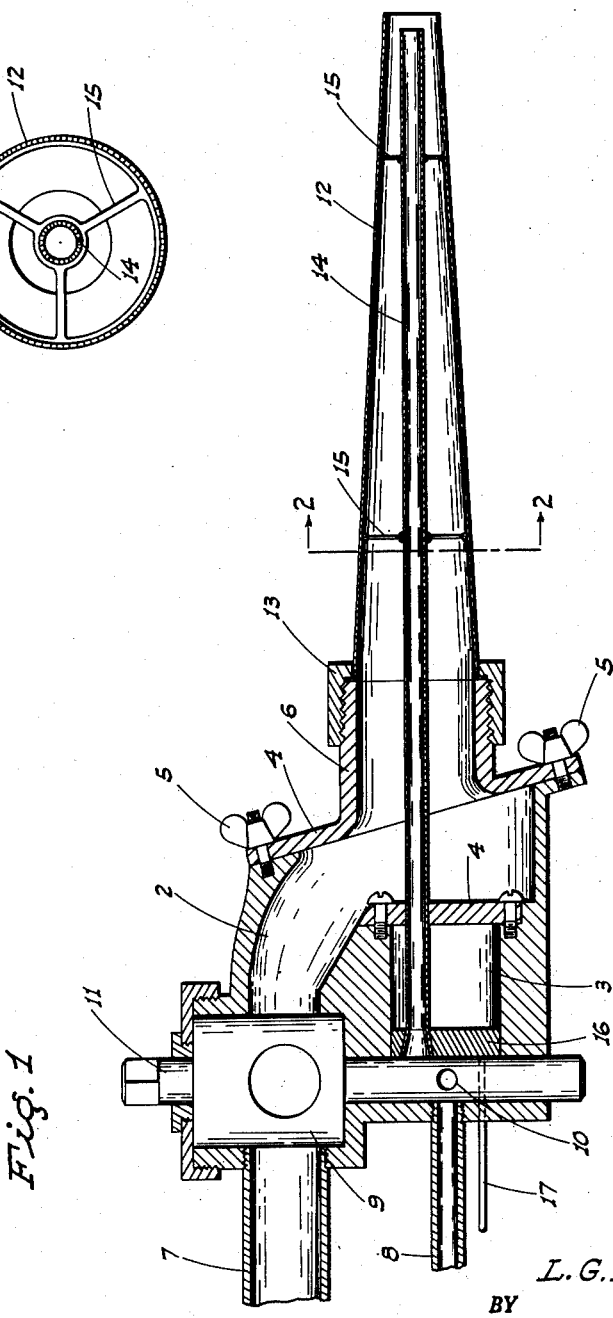
INVENTOR.
L. G. Edwards
BY
ATTYS

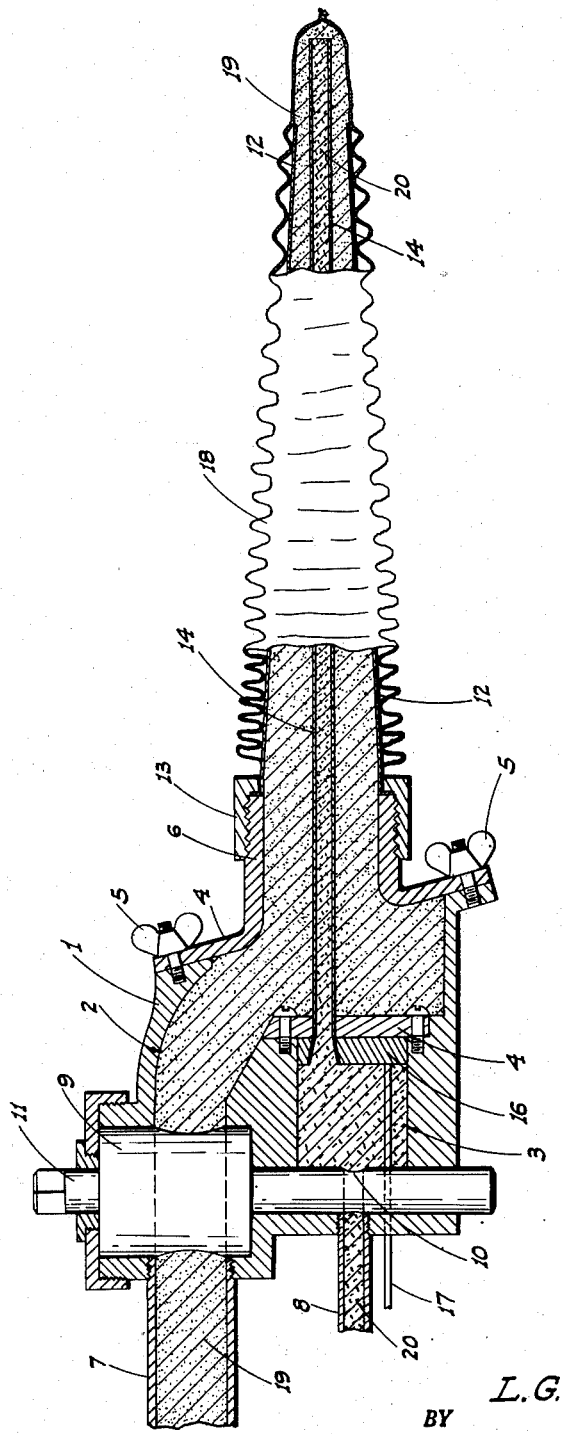

Patented Sept. 18, 1951

2,568,491

UNITED STATES PATENT OFFICE 2,568,491

SAUSAGE-CORE FORMING MACHINE

Lorin G. Edwards, Woodlake, Calif.

Application February 24, 1947, Serial No. 730,520

2 Claims. (Cl. 17—35)

This invention relates to, and it is an object to provide, an improved sausage forming machine.

Another object of the invention is to provide a sausage forming machine which is arranged to produce a sausage having a relatively small center or core extending therein; said core being a condiment such as mustard, relish or the like.

A further object of the invention is to provide a sausage forming machine, as above, wherein novel mechanism is employed to introduce the condiment into the sausage as it is shaped and cased.

A further object of the invention is to provide a practical sausage core forming machine, and one which will be exceedingly effective for the purpose for which it is designed.

These objects are accomplished by means of such structure and relative arrangement of parts as will fully appear by a perusal of the following specification and claims.

In the drawings:

Fig. 1 is a longitudinal sectional elevation illustrating a sausage forming machine embodying the present invention; the parts being shown in starting position.

Fig. 2 is a cross section on line 2—2 of Fig. 1.

Fig. 3 is a view similar to Fig. 1, but shows the parts in working position, with a sausage being formed.

Referring now more particularly to the characters of reference on the drawings, the machine includes a body 1 which is hollow; the interior of such body including a main chamber 2 and a separate cylinder 3 closed by a front end wall 4 from the remainder of the chamber 2.

The forward end of the hollow body 1 comprises a removable front plate 4, held in place by wing nuts 5; there being a tubular boss or neck 6 formed with said front plate in communication with the main chamber 2 and projecting forwardly.

A sausage meat feed pipe 7 leads into the body 1 from the back thereof to communication with the main chamber 2, while a condiment feed pipe 8 leads into the body 1 from the back to communicate with the cylinder 3.

Sausage meat and condiment under pressure is fed through the pipes 7 and 8 from a suitable source (not shown).

Rotary valves 9 and 10 are mounted in the body 1 between the sausage meat feed pipe 7 and the main chamber 2, and between the condiment feed pipe 8 and the cylinder 3, respectively. The rotary valves 9 and 10 are axially alined and are formed in connection with a common control shaft 11. The assembly of the rotary valves 9 and 10, and the shaft 11, may be termed a double plug valve unit. It will be seen that in the normal starting position of Fig. 1, the valves 9 and 10 are closed, but upon rotation of the shaft 11 to a certain position said valves simultaneously open.

A sausage meat feeding tube 12, which is elongated and tapered toward its outer end, is fixed in connection with, and projects axially outwardly from, the neck 6 by means of a holding collar 13.

A relatively small-diameter, central tube 14 extends axially in the feeding tube 12; being supported by spaced spiders 15 in axially slidable relation therethrough. At its inner end portion the central tube 14 slidably extends through the wall 4, into the cylinder 3, and is fixed in connection with a piston 16 slidable in said cylinder, opening through said piston.

A pull rod 17 on the piston 16 extends through the back wall of the body 1 for manual access, whereby the piston 16 may be retracted by hand to its starting position, as in Fig. 1.

In such starting position of the piston 16, the outer or free end of the central tube 14 is disposed within the feeding tube 12, i. e. does not project beyond the outer end of the latter. With the central tube 14 in this position, and the rotary valve unit closed, a sausage casing 18 is slipped or stretched onto the feeding tube 12 from its outer end, and until such casing is full on said tube, at which time the casing tends to fold or accordion, as shown.

Thereafter, the valve unit is actuated to open the rotary valves 9 and 10. When this occurs sausage meat under pressure feeds from pipe 7, through valve 9, into main chamber 2, and thence along the feeding tube 12, filling the latter. The sausage meat, as indicated at 19, then extrudes from the forward end of the feeding tube 12, carrying the casing 18 outwardly therewith, filling the same to form a sausage.

Simultaneously with the above operation, condiment under pressure feeds from pipe 8, through valve 10 into the cylinder 3, advancing the piston 16 to the position shown in Fig. 3, and causing projection of the outer end portion of the central tube 14 beyond the corresponding end of the tube 12. Immediately upon advance of the piston 16 the condiment 20 feeds through the central tube 14 and is discharged from its forward end as a core in the sausage being produced.

The central tube 14 must of course be retracted at the outset to permit of placement of the sausage casing 18 full on the tube 12. However, during the sausage forming operation, projection of the central tube 14 is desirable for the reason that the condiment is not delivered from such tube into the sausage until it has been formed by extrusion from the tube 12. In this manner clean separation or definition between the sausage meat and the condiment core is maintained.

After the sausage is formed, the valve unit is closed, and the piston 16 is retracted preparatory to the next sausage forming operation.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. In a sausage forming machine, a stationary tapered sausage meat feeding tube through which meat is fed under pressure and having an outlet at its small end, and a condiment feeding tube of small diameter relative to said outlet extending lengthwise in the meat tube and initially terminating within said meat tube adjacent its outlet, means slidably mounting the condiment tube on the machine for axial movement in the meat tube to enable said condiment tube to be advanced when in operation through and beyond the meat tube outlet a predetermined distance, a fixed condiment supply conduit on the machine, and means on the machine interposed between the condiment tube and conduit and including a member connected to said tube, functioning upon feeding of condiments under pressure from said conduit to thus advance said condiment tube.

2. In a sausage forming machine, a stationary tapered sausage meat feeding tube through which meat is fed under pressure and having an outlet at its small end, and a condiment feeding tube of small diameter relative to said outlet extending lengthwise in the meat tube and initially terminating within said meat tube adjacent its outlet, means slidably mounting the condiment tube on the machine for axial movement in the meat tube to enable said condiment tube to be advanced when in operation through and beyond the meat tube outlet a predetermined distance; a cylinder on the machine, an initially retracted piston slidable in the cylinder and secured on the inner end of the condiment tube, the latter opening through the piston, and a condiment supply conduit connected to the cylinder in position to cause condiments issuing under pressure from the conduit to engage and advance the piston and feed condiments through the condiment tube.

LORIN G. EDWARDS.

REFERENCES CITED

The following references are of record in the file of this patent:

UNITED STATES PATENTS

| Number | Name | Date |
|---|---|---|
| 516,648 | Harton | Mar. 20, 1894 |
| 1,107,184 | Priban | Aug. 11, 1914 |
| 1,664,337 | Vanderput | Mar. 27, 1928 |
| 2,271,767 | Hummel | Feb. 3, 1942 |
| 2,330,496 | Kidd | Sept. 28, 1943 |